United States Patent [19]

Close

[11] 4,088,281

[45] May 9, 1978

[54] DUAL TENSION SINGLE SPRING RETRACTOR

[75] Inventor: Albert R. Close, Newhall, Calif.

[73] Assignee: American Safety Equipment Corporation, Encino, Calif.

[21] Appl. No.: 731,665

[22] Filed: Oct. 13, 1976

[51] Int. Cl.² .................. A62B 35/00; B65H 75/48
[52] U.S. Cl. .............................. 242/107; 242/107.4 R
[58] Field of Search .................... 242/107–107.7; 297/388; 280/744–747

[56] References Cited

U.S. PATENT DOCUMENTS

| | | | |
|---|---|---|---|
| 1,944,264 | 1/1934 | Oravec et al. | 242/107 |
| 1,967,902 | 7/1934 | Reichel | 242/107 |
| 2,514,144 | 7/1950 | Shedlock | 242/107 |
| 3,976,257 | 8/1976 | Fohl | 242/107 X |
| 3,984,063 | 10/1976 | Knieriemen | 242/107 |
| 3,997,126 | 12/1976 | Karlsson | 242/107 |

Primary Examiner—Harvey C. Hornsby
Assistant Examiner—John M. Jillions
Attorney, Agent, or Firm—Poms, Smith, Lande & Glenny

[57] ABSTRACT

An emergency locking safety belt retractor having a safety belt wound upon a reel has a dual tension single spring retraction means including reduction gear means interposed between the reel and retractor spring which is selectively operated to reduce the force of the spring means upon the reel when the safety belt is protracted to a position of use and then slightly retracted for a limited amount of retraction movement during which the safety belt is in a "low tension zone" condition until the limited retraction movement allowed is exceeded and the full force of the spring is reapplied through the gear means to the reel.

16 Claims, 9 Drawing Figures

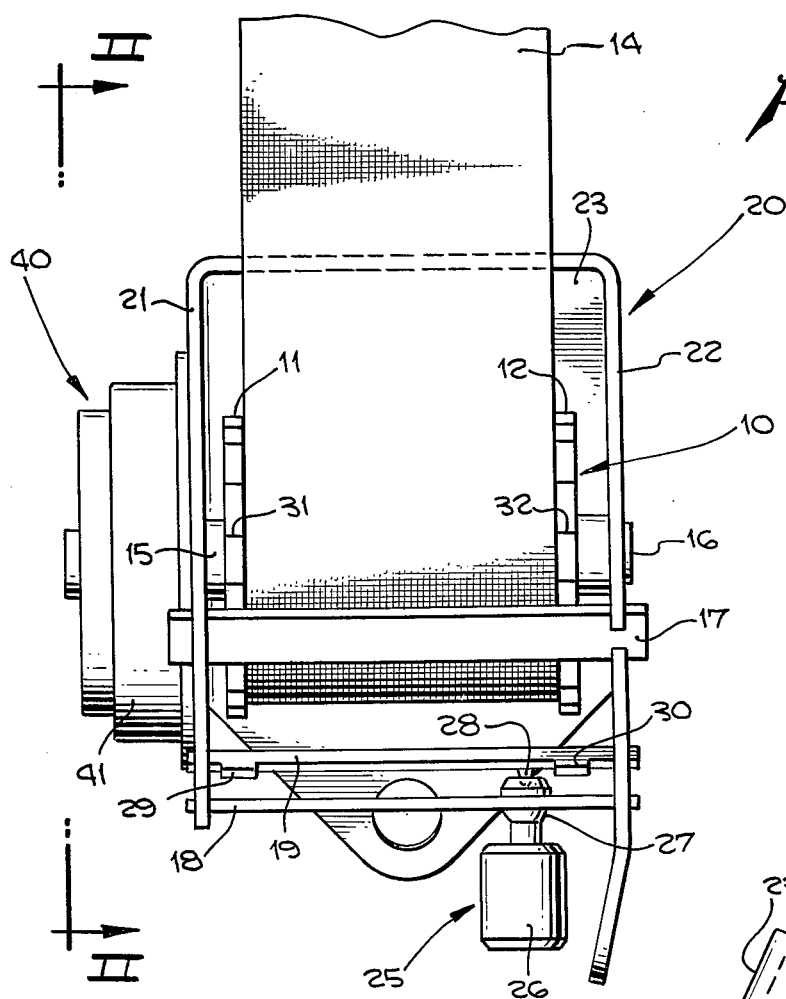
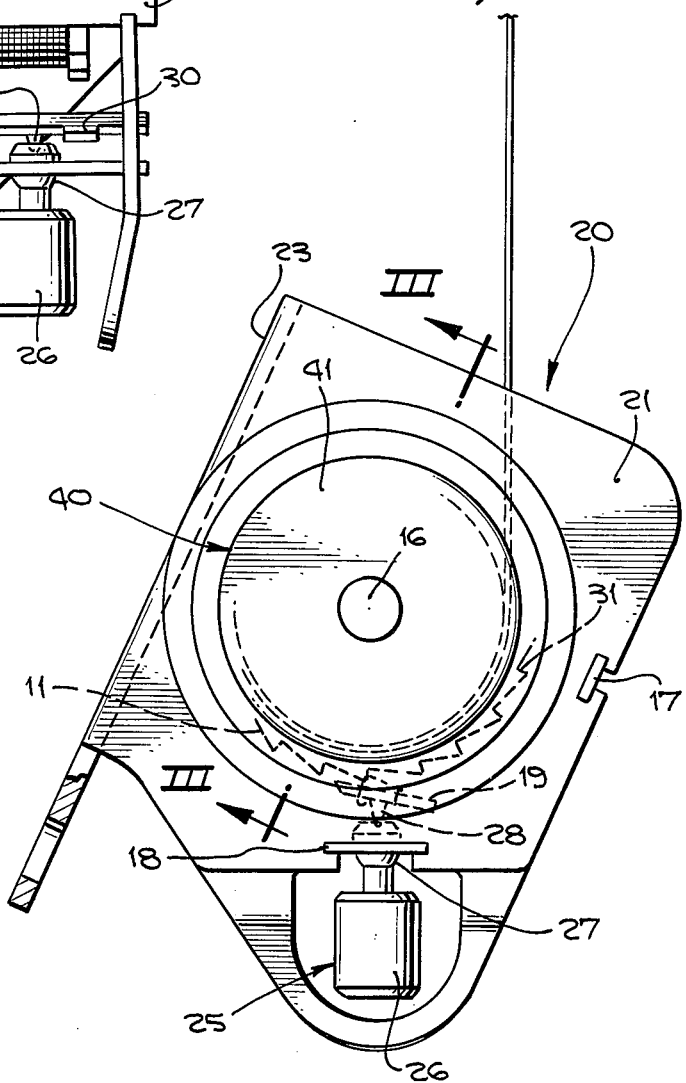
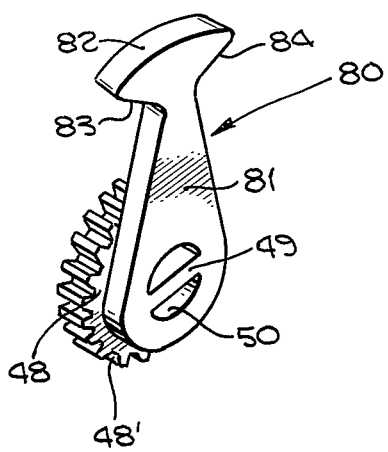

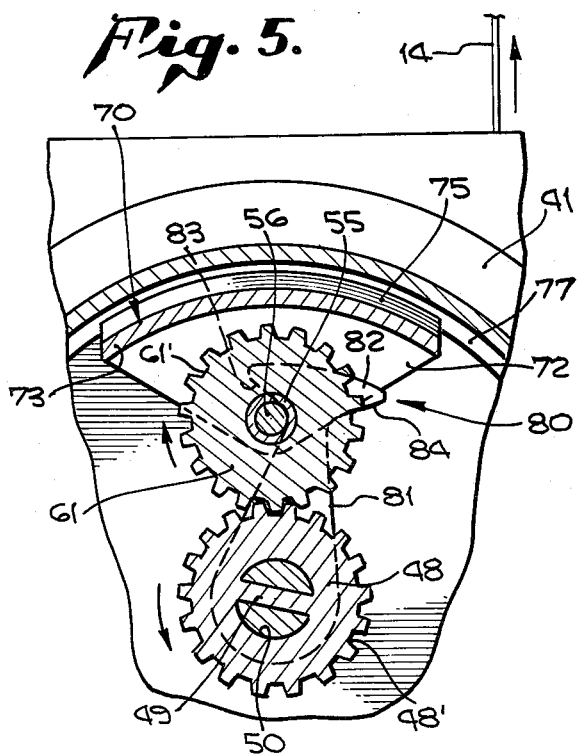
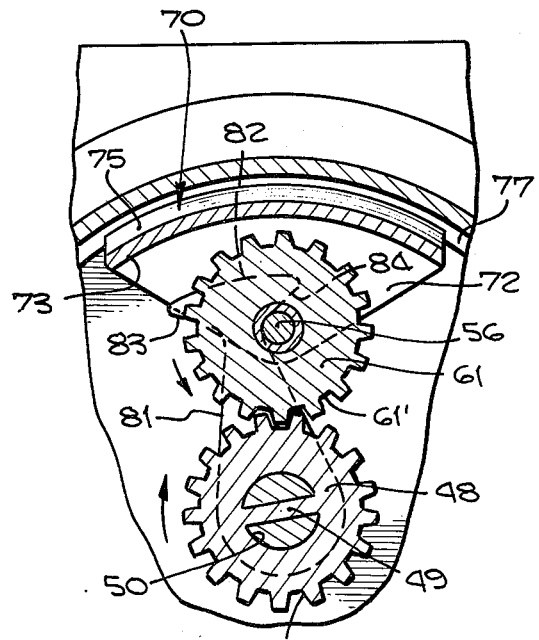
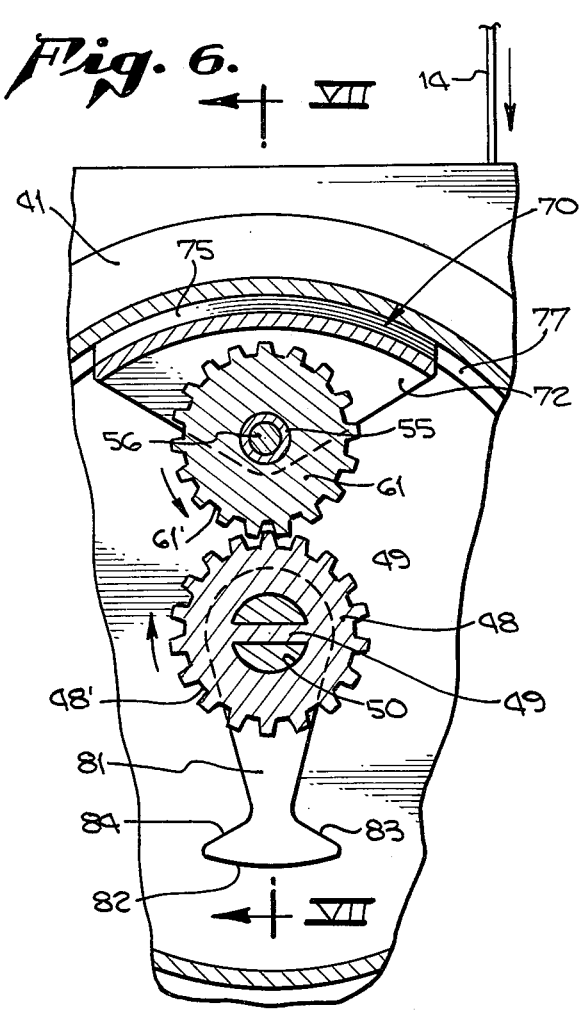
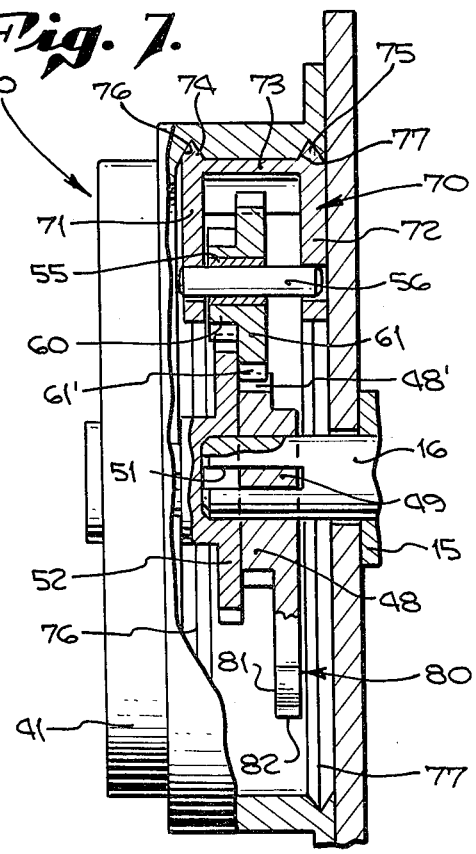

DUAL TENSION SINGLE SPRING RETRACTOR

BACKGROUND OF THE INVENTION

The present invention relates in general to emergency locking retractors and means for reducing the tension applied to the safety belt due to the retractor rewind spring when the belt is placed in use. More specifically, the present invention relates to a dual tension single spring retraction means for an emergency locking retractor which provides for a reduced tension on the safety belt when the belt is placed in use as compared to a higher tension applied by the retractor spring to the belt durng normal protraction and retraction.

Various types of emergency and automatic locking retractors have been employed heretofore for restraining passengers in their seats in vehicles such as automobiles. Some passengers find the tension applied to the safety belt, particularly the chest strap of a safety belt harness system, due to the retractor rewind spring objectionable when the belt is placed in use. In order to overcome such undesirable belt tension, various means have been developed heretofore for reducing the tension of the safety belt retractor spring upon the safety belt when the belt is placed in use. An example of one such prior effort is U.S. Pat. No. 3,834,646 wherein the rewind bias of the retractor spring is entirely blocked upon a predetermined manipulation of the protracted belt. Other approaches, as that of U.S. patent application Ser. No. 769,682 filed Feb. 17, 1977 which is a continuation of U.S. patent application Ser. No. 627,875 filed Oct. 31, 1975, now abandoned, in the name of Charles Ulrich and assigned to the assignee of the present application improve upon the prior patent in providing for a lower tension belt rewinding bias while the main biasing effect of the rewind spring is blocked out so that a loose belt condition is avoided and the belt will be retracted under the low tension bias for a limited extent of travel and then rewound under full bias of the retractor spring without the need for a protraction of the belt to release the tension relieving means as in the foregoing patent.

I have heretofore recognized that it would be desirable to provide a dual tension retraction mechanism for a safety belt retractor utilizing a single retractor spring and having gear means for transmitting the spring force to the reel and selectively operating the gear means in a force transmitting mode.

SUMMARY OF THE INVENTION

It is therefore the primary object of the present invention to disclose and provide a dual tension single spring retraction means for a safety belt retractor having a safety belt wound upon a reel and spring means for biasing the reel toward a belt retracted position wherein the rewind spring tension applied to the safety belt may be selectively reduced through a predetermined manipulation of the safety belt when placed in use.

It is a further object of the present invention to disclose and provide an improvement in retraction means as in the foregoing object wherein the rewind force of a single retractor spring is transmitted through gear means to the retractor reel and further that the gear means be so provided as to selectively reduce the resultant force of the spring means upon the reel in response to a predetermined manipulation of the safety belt when placed in use.

Generally stated, the present invention in retraction means for a safety belt retractor comprises the provision of gear means interposed between the reel and spring means for transmitting the bias of the spring to the reel and more specifically a force reduction gear means for selectively reducing the biasing effect of the spring means on the reel. Means for selectively activating the force reduction means according to the present invention include the provision of a friction brake means and associated clutch means for normally holding the gear means in a direct drive mode wherein the full force of the spring means is transmitted to the reel. On a slight retraction movement of the safety belt following protraction of the belt to a position of use, the clutch means of the present invention operates the gearing means and associated friction brake means to hold the force reduction gear means in an operative position wherein the force drive from the retractor spring to the reel passes through a gear train including reduction gear means reducing the spring force effect upon the reel.

A more complete understanding of the present invention in dual tension single spring retraction means, as well as an appreciation for the various advantages and objects of the present invention will be afforded to those skilled in the art from a consideration of the following detailed explanation of a preferred exemplary embodiment thereof. Reference will be made to the appended sheets of drawings which will be described briefly first.

BRIEF DESCRIPTION OF THE DRAWINGS

FIG. 1 is a front view of an exemplary emergency locking safety belt retractor having a preferred exemplary embodiment of the present invention in dual tension single spring retraction means;

FIG. 2 is a side view of the retractor of FIG. 1; partially in section, taken therein along the plane II—II;

FIG. 5 is a detail view as in FIG. 4 taken along the plane V—V in FIG. 3 showing a belt protraction effect on the retraction means;

FIG. 6 is a view as in FIG. 5 showing the effect of a belt retraction following an initial protraction;

FIG. 7 is a section view taken in FIG. 6 along the plane VII—VII;

FIG. 8 is a view as in FIGS. 5 and 6 showing the retraction means during a full retraction movement of the safety belt; and FIG. 9 is a detail view of a portion of the retraction means in accordance with the present invention.

DETAILED DESCRIPTION OF THE PREFERRED EXEMPLARY EMBODIMENT

Figure 3:
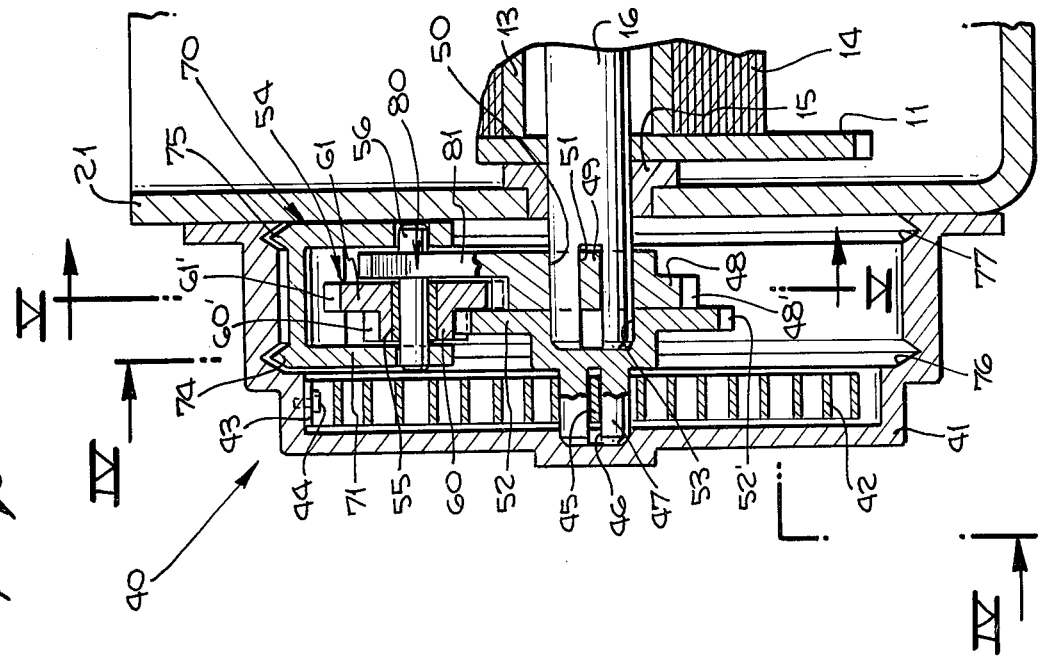
FIG. 3 is a detail section view of the present preferred exemplary embodiment in dual tension single spring retraction means of the retractor of FIGS. 1 and 2 taken along the plane III—III in FIG. 2.

An exemplary embodiment of emergency locking safety belt retractor as illustrated in FIGS. 1 and 2 and comprises a safety belt reel, indicated generally at 10, rotatably mounted in a retractor frame indicated generally at 20 in known manner. Reel 10 includes a pair of opposed ratchet wheels 11 and 12 mounted about a central hub 13, as seen in FIG. 3, upon which a safety belt 14 is wound. Reel 10 is mounted upon a shaft 16 which is rotatably journaled in the opposed side walls 21 and 22, interconnected by base 23 by means of bushings, as bushing 15, inserted in said side walls 21 and 22 of the retractor frame. A cross brace 17 is provided between side walls 21 and 22 for a structural rigidity as is a second cross brace 18, the latter also mounting a vehicle inertia sensor means indicated generally at 25. In the exemplary embodiment, such vehicle inertia sensor means comprise a pendulum mass 26 pivotally suspended by a head portion 27 seated in an appropriate mounting aperture in cross brace 18 beneath a lock bar 19 which is also pivotally mounted in side walls 21 and 22 in known manner. An upper surface of head portion 27 of the inertia sensor means is adapted to engage and move a cam member 28 positioned on the underside of lock bar 19 so that when there is a sudden change in vehicle inertia, mass 26 pivots head 27 to cause a concave upper surface of the head 27 to cam member 28 in a manner to lift locking projections 29 and 30 of the lock bar into engagement with the ratchet teeth 31 and 32 of the ratchet wheels 11 and 12, respectively. As thus far described, the emergency locking retractor employs the construction of the retractor of U.S. Pat. No. 3,889,898, the disclosure of which is incorporated herein by reference.

As particularly contemplated within the present invention, dual tension single spring retraction means are employed for urging safety belt 14 through reel 10 to a stored condition while providing for a reduced tension condition due to the retractor spring when the safety belt 14 is protracted to a position of use. Such means are indicated generally at 40 and are provided within the housing 41 as hereinafter explained.

Figure 4:
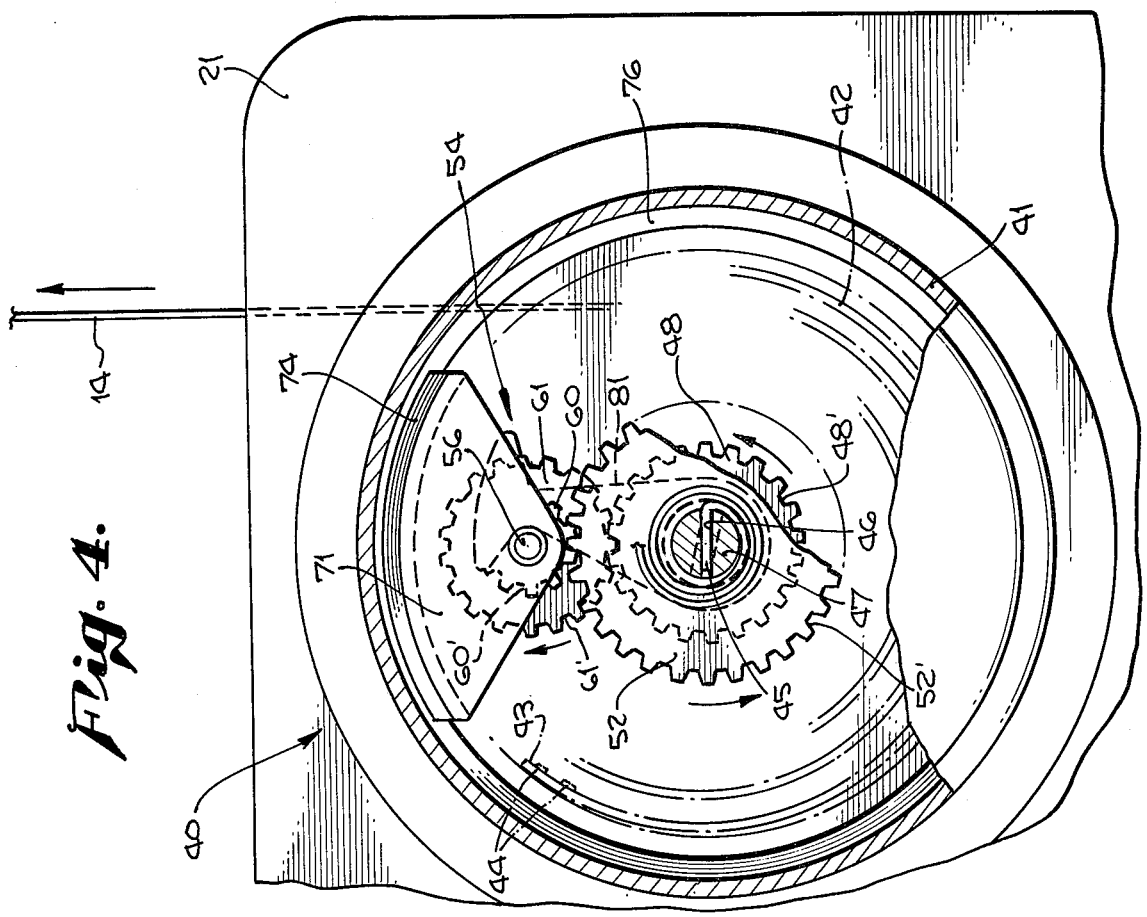
FIG. 4 is a detail view, partially in section, of the retraction means of FIG. 3 taken therein along the plane IV—IV.

Referring now to FIGS. 3 and 4, a conventional coil spring suitable for safety belt retractors is provided within housing 41 and includes a spring body 42 of coil configuration having an outer end 43 secured by fastener 44 to housing 41 and an inner end 45 seated within slot 46 of stub shaft 47.

Gear means are interposed between the safety belt reel, indicated generally at 10, and the spring means 42 for transmitting the bias of the spring to the reel. In the preferred exemplary embodiment, such gear means comprise the provision of a first gear 48 connected to the reel through reel shaft 16, gear 48 having a web 49 transversing an aperture 50 formed therein so as to receive shaft 16 within aperture 50 and shaft spline 51 about web 49 as seen in FIG. 3. Second gear means 52 is connected by its integrally formed stub shaft 47 to the retractor spring 42, as seen in FIG. 3, and is provided with a cylindrical blind bore 53 by which gear means 52 is rotatably mounted on the end of reel shaft 16. First gear mans 48 and second gear means 52 are interconnected by the idler gear means 54 which is rotatably mounted by its internal bushing 55 on axle 56 mounted to arms 71 and 72 formed integrally of cage 70 described hereinafter. During normal protraction and retraction of the safety belt, the gears 52, 54 and 48 will rotate in unison as described hereinafter, providing a direct force transmission from sring 42 to reel 10. However, on operation of clutch means as hereinafter explained, a gear reduction means provides for a low tension effect upon the safety belt when it is placed in use.

Force reduction gear means are provided in accordance with the present invention for reducing the biasing effect of the spring means 42 upon reel 10 when the belt is placed in a position of use. In accordance with the preferred exemplary embodiment, such force reduction gear means comprise the provision of a relatively large working diameter for gear teeth 52' of gear 52 and a relatively small mating gear portion 60 of idler gear 54, gear teeth 60' of gear 60 having a relatively small working diameter, and a relatively larger integrally formed gear portion 61 of idler gear 54, gear teeth 61' having a relatively larger working diameter than gear teeth 60' and the provision of gear 48 of smaller working diameter than gear 52, teeth 48' meshing with teeth 60', as best seen in FIG. 3. From the foregoing, it can be seen that any amount of force reduction can be achieved through the use of the gear reduction means as described, by adjusting the relative working diameters to give a desired mechanical advantage to reel shaft 16 relative to spring 42 when the force is transmitted through the gearing with idler gear 54 being retained stationary. Means are provided according to the within invention for selectively activating the force reduction gear means by a clutch mechanism operable in response to a predetermined belt manipulation to hold shaft 56 of idler gear stationary so as to activate the force transmitting gear chain from spring 42 through gear 52, 60, 61 and 48 to shaft 16.

Friction brake means are provided for selectively holding the reduction gear means 54 against rotation within housing 41. In the exemplary embodiment, such friction brake means include the provision of a cage member, indicated generally at 70 in FIGS. 3 and 7 which includes side wall 71 and 72 in which shaft 56 is journaled. Web 73 interconnects side walls 71 and 72 of the cage which has an arcuate extent, as seen in FIGS. 5 and 8 with upper ends of side walls 71 and 72 terminating in arcuate pointed ribs 74 and 75. Housing 41 is provided with a pair of peripheral grooves 76 and 77 adapted to matingly receive ribs 74 and 75, respectively. When cage 70 is forced radially outwardly, it frictionally engages housing grooves 76 ad 77 acting as a friction brake to retard rotational movement of shaft 56 about within housing 41.

As is particularly contemplated within the present invention, the fit between gear teeth 52' of gear 52 and teeth 60' of gear 60, as well as the fit between gear teeth 61' of gear 61 and meshing teeth 48' of gear 48 is purposely provided in a loose or sloppy fit so that when there is a gear drive from gear 52 to gear 60 and from gear 61 to gear 48, or in the reverse order, the gears tend to spread forcing shaft 56 of composite gear 54 radially outwardly and thus driving cage ribs 74 and 75 into engagement with the interior grooves 76 and 77 of housing 41. However, such radially outward movement of shaft 56 and its cage 70 is normally prevented by camming means operable in response to reel rotation caused by manipulation of the safety belt during protraction and retraction operations.

As seen in FIG. 9 in detail, and shown in its assembled relation to FIGS. 3 through 8, camming means indicated generally at 80 are provided in association with reel 10, and its shaft 16, for selective operation as a friction clutch means to either hold reduction gear means shaft 56 stationary or allow it to revolve freely and thus deactivate the gear reduction means to apply the full spring force to the reel. The camming means, indicated generally at 80, in the preferred exemplary embodiment, comprises a cam arm 81 formed integrally of gear 48, as seen in FIG. 9, with a head 82 presenting opposing inwardly facing camming surfaces 83 and 84. As seen in FIG. 5, upon a protraction of the safety belt, the reel shaft 16 rotates counterclockwise causing arm 81 to bring head portion 82 into engagement with cage 70, and specifically to place cam surface 83 over shaft 56 and moving cage 70 away from housing grooves 76 and 77. The gear means and cage 70 all revolve in unison under the action of cam arm 81 through head 82 on shaft 56 during protraction of the safety belt winding spring 42 against its full rewind bias.

When the safety belt is protracted to a position of use, a slight retraction movement of the safety belt 14 as seen in FIG. 6 causes reel shaft 16 to rotate gear 48 and cam arm 81 in a counterclockwise direction removing cam head 82 and its surface 83 from engagement with shaft 56. By virtue of the loose or sloppy fit between gears 48 and 61, as well as gears 52 and 60, the drive through the gear means causes shaft 56 to move radially outwardly from the position of FIG. 5 to the position of FIG. 6 wherein cage 70 is in a frictional clutch type of engagement with the interior portions of housing 41. Such frictional engagement between cage 70 and housing 41 holds shaft 56 stationary causing the force of spring 42 to operate through the relatively rotating gears 42, 60, 61 and 48 to drive reel 10 in a rewind direction. The force reducing means of the gear train thus provided causes a reduced tension effect upon the webbing until retraction movement of belt 14 causes arm 81 to move in a full counterclockwise revolution to the position of FIG. 8. As seen in FIG. 8, such retraction movement of safety belt 14 beyond the limited amount allowed for due to the single rotation of reel 10 from the positions of FIG. 5 to that of FIG. 8 wherein cam head 82 has rotated in a clockwise direction bringing camming surface 84 into engagement over shaft 56 to draw it inwardly and move gears 61 and 48 into tighter mesh as well as gears 60 and 52 into tighter mesh. The gears and cam 81 then revolve in unison about the axis of reel shaft 16 transmitting the full rewind force of spring 42 to shaft 16 and its associated reel 10.

Having thus described in exemplary embodiment of the improvement in dual tension single spring retraction means in accordance with the present invention, it can be seen by those skilled in the art that the aforestated objects and various advantages of the within invention have been attained by the preferred exemplary embodiment disclosed herein and that various modifications, alterations and adaptations thereof may be made within the scope of the present invention which is defined by the following claims.

I claim:

1. In a safety belt retractor having a safety belt wound upon reel and spring means for biasing said reel toward a belt retracted position, the improvement comprising the provision of:
   force reduction gear means interposed between said reel and spring means for transmitting the full bias of said spring to said reel when in a deactivated position and for reducing the bias effect of said spring means on said reel when in an activated position; and
   means for selectively activating said force reduction gear means to said activated position to provide a reduced tension on said belt due to reducing the biasing effect of said spring means.

2. The retractor of claim 1 wherein said activating means comprises means responsive to a limited retractive movement of said reel to activate said force reduction gear means whereby said belt is placed in a reduced tension condition for a limited extent of belt travel in a retractive direction following protraction to a position of use, said activating means deactivating said force reduction gear means on protraction or retraction of said belt beyond said limited extent of belt travel.

3. The retractor of claim 1 further including:
   a first gear connected to said reel and a second gear connected to said spring means; and
   said reduction gear means comprises a dual gear of differing working diameters meshing with said first and second gears respectively.

4. The retractor of claim 3 wherein said first, second and dual gears have axes of rotation and wherein:
   means are provided for mounting said dual gear for limited movement in a direction generally perpendicular to its axis of rotation and for rotation of said dual gear about the axes of said first and second gears; and
   gear teeth on said first, second and dual gears, said first and second gears causing movement of said dual gear in said perpendicular direction upon driving of said first and second gears due to said gear teeth means.

5. The retractor of claim 4 wherein:
   brake means are mounted to said dual gear for braking movement of said dual gear about the axes of said first and second gears when said dual gear moves in said limited perpendicular movement under the action of said first and second gears.

6. The retractor of claim 5 wherein:
   cam means are provided for normally holding said dual gear against said perpendicular movement during protraction and retraction of said belt and for releasing said dual gear during a limited retractive movement of said reel following protraction to a position of use.

7. The retractor of claim 6 wherein said dual gear has a cam follower and said cam means comprises:
   cam arm means driven by said reel and including a cam head having opposing cam surfaces for alternately engaging said cam follower on said dual gear in response to rotation of said reel in opposite directions, said cam means releasing said cam follower for the extent of reel travel between engagements to provide a reduced tension effect on said belt due to said spring means when said follower is released.

8. A safety belt retractor having a belt storage spool mounted on a shaft which is journaled for rotation in a retractor frame and a rewind spring biasing said spool toward a belt storage condition comprising:
   a first gear fixed on said spool shaft for rotation therewith;
   a second gear rotatably mounted on said retractor coaxially of said shaft and connected to said rewind spring to wind and unwind said spring on opposite rotations of said gear, respectively;
   reduction gear means having an axis of rotation and means for mounting it interposed in driving relation between said first and second gears and for rotation with said gears about said shaft;
   friction brake means connected to said reduction gear means for engaging relatively stationary portions of said retractor when activated to hold the axis of said reduction gear means stationary relative to said gears to cause a force reduction drive between said gears; and
   clutch means including the provision of gear teeth means on said reduction gear means for promoting a radial separation of said reduction gear means from said first and second gears under driving relation to activate said brake means, means for mounting said axis of said reduction gear means for such separation movement and cam means driven by said spool shaft for holding said reduction gear means against said movement on protraction and retraction of said belt and for releasing it for a limited belt retractive movement when the belt is placed in use.

9. A safety belt retractor having a belt storage spool journaled for rotation in a retractor frame and a rewind spring biasing said spool toward a belt stored condition, comprising:

transmission means connected between said spool and said spring for winding said spring against its full bias upon a belt unwinding motion of said spool due to protraction of portions of said belt from said spool, said transmission means including force reduction means having activated and deactivated positions for selectively reducing the force of said spring acting on said spool through said transmission means when said force reduction means is activated; and means for activating said force reduction means on a predetermined movement of said spool due to a predetermined movement of said belt when protracted to a position of use.

10. The retractor of claim 9 wherein said transmission means comprises a first gear driven by said spool, a second gear connected in driving relation to said spring and a reduction gear means interposed in driving relation between said first and second gears.

11. The retractor of claim 9 wherein said transmission means includes a gear train comprising a plurality of gears.

12. The retractor of claim 11 wherein said force reduction means comprises a reduction gear interposed in driving relation with said plurality of gears.

13. The retractor of claim 9 wherein said means for activating said force reduction means comprises means for activating said force reduction means in response to a limited retractive movement of said spool when said belt is in a position of use.

14. The retractor of claim 9 wherein said activating means comprises:

friction brake means moveaby mounted within said retractor for movement in response to spool movement and including means for engaging and frictionally braking its movement against a relatively stationary portion of said retractor upon its operation by a retractive movement of said spool; and means for interconnecting said brake means to said transmission means to activate said force reduction means upon a braking operation of said braking means.

15. The retractor of claim 14 wherein said transmission means comprises a gear train of a plurality of gears in intermeshing relation and including a first gear driven by said spool, a second gear connected to said spring and a reduction gear means interposed between said first and second gears;

said means for interconnecting said brake means includes means for mounting it to said reduction gear means;

means mounting said reduction gear means for lateral movement with respect to said first and seond gears, gear teeth means on said reduction gear means and the first and second gears for providing a loose gear teeth mesh, said reduction gear means moving laterally when in driving relation with said first and second gears thereby activating said friction brake means, whereby said reduction gear means is activated.

16. The retractor of claim 15 wherein cam means driven by said spool are provided for holding said reduction gear means against said lateral movement on protraction and retraction of said belt and for releasing it during a limited belt travel at a belt protracted position of use whereby a reduced tension is applied to said belt during said limited travel.

* * * * *

Disclaimer

4,088,281.—*Albert R. Close*, Newhall, Calif. DUAL TENSION SINGLE SPRING RETRACTOR. Patent dated May 9, 1978. Disclaimer filed May 30, 1978, by the assignee, *American Safety Equipment Corporation*.

The term of this patent subsequent to May 31, 1994, has been disclaimed.
[*Official Gazette September 12, 1978.*]